US011384317B2

(12) United States Patent
Sallet et al.

(10) Patent No.: US 11,384,317 B2
(45) Date of Patent: Jul. 12, 2022

(54) SURFACE MODIFICATION OF MICROCAPSULES

(71) Applicant: GIVAUDAN SA, Vernier (CH)

(72) Inventors: Pauline Sallet, Villeurbanne (FR); Etienne Fleury, Soucieu en Jarrest (FR); Aurelia Charlot, Meyzieu (FR); Julien Bernard, Lyons (FR)

(73) Assignee: GIVAUDAN S.A., Vernier (CH)

( * ) Notice: Subject to any disclaimer, the term of this patent is extended or adjusted under 35 U.S.C. 154(b) by 8 days.

(21) Appl. No.: 16/481,591

(22) PCT Filed: Feb. 12, 2018

(86) PCT No.: PCT/EP2018/053393
§ 371 (c)(1),
(2) Date: Jul. 29, 2019

(87) PCT Pub. No.: WO2018/149775
PCT Pub. Date: Aug. 23, 2018

(65) Prior Publication Data
US 2020/0002651 A1     Jan. 2, 2020

(30) Foreign Application Priority Data

Feb. 15, 2017   (GB) ..................................... 1702430

(51) Int. Cl.
| | | |
|---|---|---|
| *C11D 3/50* | (2006.01) | |
| *B01J 13/22* | (2006.01) | |
| *C11D 3/22* | (2006.01) | |
| *C11D 3/386* | (2006.01) | |
| *C11D 11/00* | (2006.01) | |
| *C11D 17/00* | (2006.01) | |

(52) U.S. Cl.
CPC ............... *C11D 3/505* (2013.01); *B01J 13/22* (2013.01); *C11D 3/222* (2013.01); *C11D 3/38627* (2013.01); *C11D 11/0017* (2013.01); *C11D 17/0039* (2013.01)

(58) Field of Classification Search
CPC ......... C11D 9/44; C11D 11/0017; C11D 3/50; C11D 3/502; C11D 3/505
See application file for complete search history.

(56) References Cited

U.S. PATENT DOCUMENTS

| | | | |
|---|---|---|---|
| 2008/0193761 A1* | 8/2008 | Naylor Rocha Gomes | ................ D06P 1/0016 428/402.21 |
| 2011/0031179 A1 | 2/2011 | Chen et al. | |
| 2012/0076864 A1* | 3/2012 | Vandendaele | .......... A01N 25/28 424/492 |
| 2018/0118947 A1* | 5/2018 | Dey | ...................... C08G 75/00 |

FOREIGN PATENT DOCUMENTS

| | | |
|---|---|---|
| WO | WO 2006/117702 A2 | 11/2006 |
| WO | WO 2010/142401 A1 | 12/2010 |
| WO | WO 2011/020652 A1 | 2/2011 |
| WO | WO 2017/001672 A1 | 1/2017 |

OTHER PUBLICATIONS

International Search Report for PCT/EP2018/053393 dated Apr. 30, 2018.
International Written Opinion for PCT/EP2018/053393 dated Apr. 30, 2018.
GB 1702430.8—Great Britain Search Report, dated Jul. 4, 2017.

* cited by examiner

*Primary Examiner* — Charles I Boyer
(74) *Attorney, Agent, or Firm* — Curatolo, Sidoti & Trillis Co., LPA; Salvatore A. Sidoti; Floyd Trillis, III

(57) ABSTRACT

A method of providing a modifier on the surface of an active-containing core-shell aminoplast microcapsule, including the covalent attachment of the modifier to the capsule shell surface by means of a coupling compound capable of covalent bonding to both shell and modifier by means of epoxy groups on the coupling compound. The method is especially useful for enhancing the substantiveness to fabrics of fragrance microcapsules added to laundry products.

18 Claims, 2 Drawing Sheets

Fig.1
Fig.1a
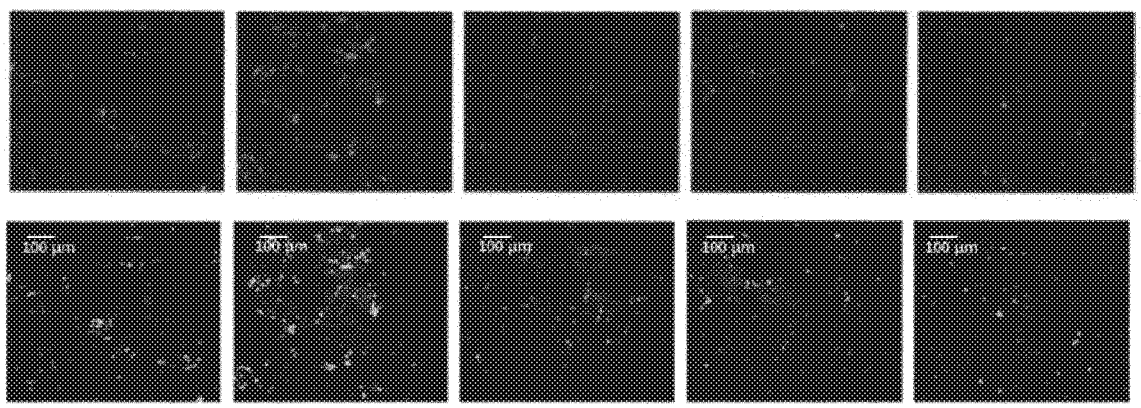
Fig.1b
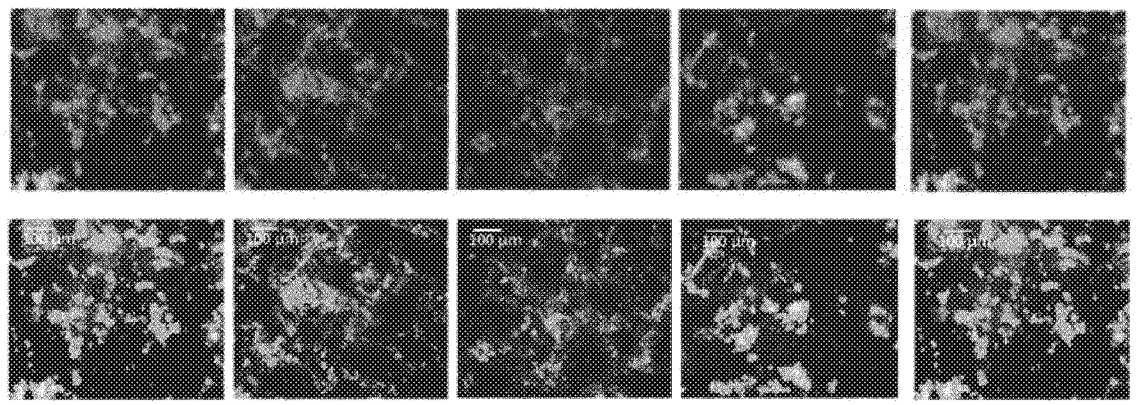

Fig. 2
Fig. 2a
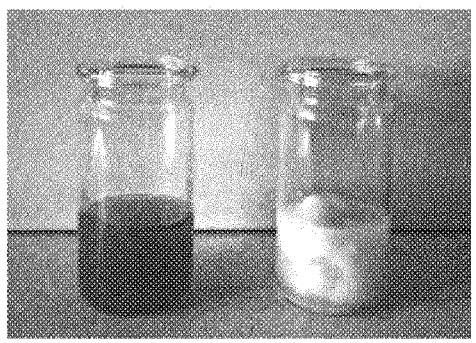
Fig. 2b
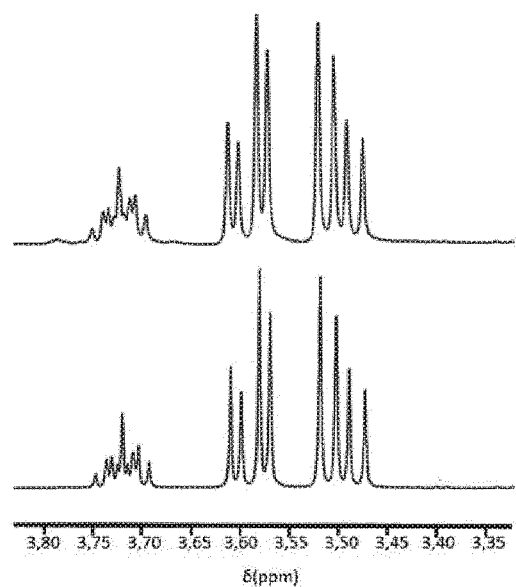
Fig. 3
Fig. 3a
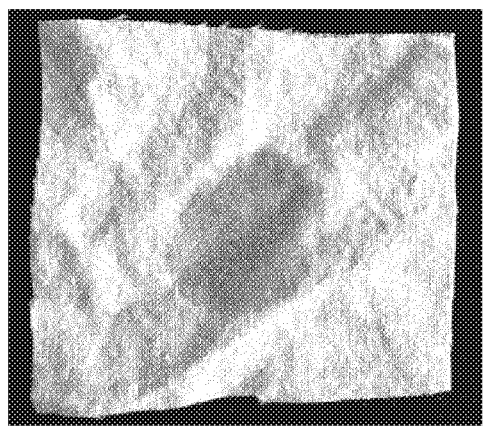
Fig. 3b
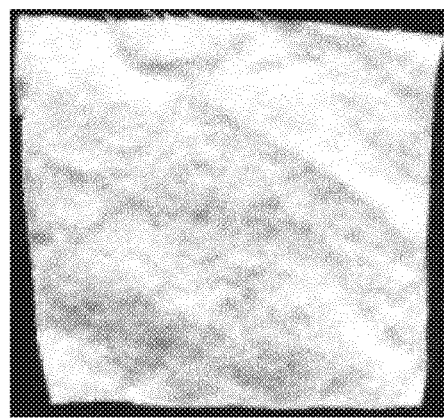

SURFACE MODIFICATION OF MICROCAPSULES

CROSS REFERENCE TO RELATED APPLICATIONS

This application is a national stage application of International Application No. PCT/EP2018/053393, filed 12 Feb. 2018, which claims priority from Great Britain Patent Application No. 1702430.8, filed 15 Feb. 2017, which applications are incorporated herein by reference.

This disclosure relates to microcapsules, and more particularly to a method of achieving a surface modification of microcapsules.

Surface modifications of microcapsules are known to the art. They are carried out to alter the capsule properties, for example, to alter their hydrophobicity, to confer substantivity to particular substrates, for example, skin, hair and fabrics, and to attach active materials such as enzymes. A typical example useful, for example, in laundry applications is a polysaccharide, examples of which include polymannanes, polyglucanes, polyglucomannanes, polyxyloglucanes, olygalactomannanes, xyloglucane, whole tamarind seed powder, and the like, all of which are known to the art. Another modifier is an enzyme, such as a lipase. These can enhance considerably the proportion of capsules adhering to a substrate—the initial deposition degree of non-modified capsules on to a fabric is always less than 100%, and after rinsing the deposition can be as low as 2-3% for some types of fabric.

One method of providing such modifiers has been simply to add the modifiers to an aqueous slurry and rely on their preferential adhesion to the capsules, held there only by relatively weak forces such as van der Waals forces and superficial mechanical entanglement. This has the disadvantage that, under some circumstances, the modifiers can be washed off the surface of the capsules, thus reducing, or even completely removing the desired effect.

A further method is by entrapment of a modifier in the capsule shell during formation. In this case, the modifier is added to the aqueous phase in which the capsules are to be formed and the modifier molecules are partially entrapped in the shell as it forms. While this has also been widely used, it also has its problems. For example, a high degree of entrapment of a modifier molecule might well secure it in place, but it may also reduce its functionality and effectiveness. And a slight degree of entrapment may mean that the modifier molecule is easily dislodged. There is simply no way to ensure an optimum degree of entrapment.

It has now been found that it is possible to modify the surface properties of microcapsules in such a way as to maintain the desirable properties. There is therefore provided a method of providing a modifier on the surface of an active-containing core-shell aminoplast microcapsule, comprising the covalent attachment of the modifier to the capsule shell surface by means of a coupling molecule capable of covalent bonding to both shell and modifier by means of epoxy groups on the coupling molecule.

There is also provided a modified core-shell aminoplast microcapsule containing an active core and comprising on the shell surface a modifier, the modifier being covalently bonded to the shell by means of a coupling molecule that is covalently bonded to both shell and modifier by means of epoxy groups on the coupling molecule.

By "active core" is meant any material whose encapsulation for subsequent release in defined circumstances is desired. Typical examples include fragrances and flavours, reactive materials such as components of multi-pack adhesives, enzymes, pharmaceuticals and agrochemicals for controlled release, and the like.

Aminoplast polymers, condensation polymers, typically urea- or melamine-formaldehyde, are among the most common capsule materials because of their relatively low price and their high performance. There has been concern about the formaldehyde content, but there exist variants that emit little or no formaldehyde, for example those capsules described in EP 2 111 214.

Aminoplast polymer capsule walls contain on their surface secondary amine groups. These will readily react with epoxides. A suitable coupling compound will contain at least two such groups, the same or different, capable of reaction with the shell and the modifier. Epoxides offer particular advantages; the reaction is very efficient and no side-products are created. Thus, compounds containing at least two epoxide groups, or compounds that allow the formation of such compounds in situ, may be used.

One particular example of a coupling compound containing two epoxy groups is poly(ethylene glycol) diglycidyl ether (PEGDE):

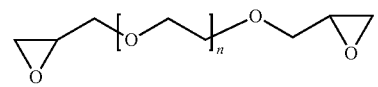

The size of n is selected such that the Mn is from 300-10,000, more particularly from 500-6000.

One alternative to PEGDE is glycidyl methacrylate (GMA), in this case, the GMA is reacted with the aminoplast shell, and then the methacrylate group is subjected to free-radical polymerisation, causing there to form a species covalently bonded to the shell and having a multiplicity of epoxy groups.

A particular example of a modifier suitable for reaction with an epoxy group is a polysaccharide. As previously mentioned, polysaccharides are among the most commonly-used modifiers for capsules, especially in the field of laundry products. A further common modifier is an enzyme, particularly a lipase. Polysaccharides and enzymes have hydroxyl groups that can form covalent bonds with epoxy groups under basic conditions.

Thus, in a particular embodiment, the modifier is a polysaccharide or an enzyme, particularly a lipase.

The forming the covalent bonds between capsule and modifier via coupling compound may be achieved by several ways. In a particular embodiment, the coupling molecule is first reacted with the capsule shell and the polysaccharide is subsequently reacted with the combination. In a further embodiment, the polysaccharide is first reacted with the coupling compound and this combination is then reacted with the capsule shell. It is possible to use a combination of these methods.

The covalent grafting of modifiers offers substantial advantages; capsules modified in this manner will not be susceptible to gradual degradation and loss of functionality and thus loss of performance. Moreover, the modifiers can use their entire functionality to interact with a substrate. This enhances considerably the ability of capsules to remain attached to a substrate under adverse conditions, for example, their application to a laundry product, such as a laundry detergent or a fabric softener, applied to a substrate that will be subject to rinsing. This means that a higher proportion of the active core (often a fragrance) will remain with the substrate to benefit the end-user.

There is therefore also provided a laundry product adapted to provide encapsulated fragrance on a washed article, comprising a laundry product base and fragrance-containing aminoplast microcapsules as hereinabove described.

By "laundry product base" is meant all the standard ingredients that are used in such compositions in art-recognised quantities, for example, surfactants, bleaching and whitening agents, water softeners, rheology modifiers, colouring matters, abrasives, enzymes, and the like.

The disclosure is further described with reference to the following non-limiting examples, which describe particular embodiments.

BRIEF DESCRIPTION OF DRAWINGS

FIG. 1a shows the results of the capsules without dextrane using optical fluorescence microscopy.

FIG. 1b shows the results of the capsules with dextrane using optical fluorescence microscopy.

FIG. 2a shows the initial olive oil emulsion (left, clear and yellow) became a white, cloudy, two-phase system (right).

FIG. 2b shows that the white, cloudy liquid was an aqueous glycerine solution based on an NMR analysis of the liquids.

FIG. 3a shows an olive oil-stained cotton tissue.

FIG. 3b shows that the olive oil stain on the cotton tissue according to FIG. 3a had disappeared after being contacted with a suspension of the lipase-functionalised capsules (7 mass %) in demineralised water at 37° C. for 24 hours.

EXAMPLE 1: POLYSACCHARIDE GRAFTING USING POLY(ETHYLENE GLYCOL) DIGLYCIDYL ETHER (PEGDE) IN AN AQUEOUS MEDIUM

Synthesis Procedure:

In a first stage, PEGDE is grafted on to capsules by contacting 2 g of washed melamine-formaldehyde capsules containing a perfume with 7 g PEGDE in a 100 ml flask under magnetic stirring during two hours at 25° C. A solution of a polysaccharide (3 g dextrane) in 100 ml aqueous buffer solution (20 mM glycne/NaOH) at pH 11 was added to the flask. The mixture was stirred at 70° C. for three hours to complete the reaction. To isolate the capsules, the mixture was cooled down, the capsules filtered and rinsed with copious amounts of water in order to remove the non-reacted traces of reagents.

For the purpose of characterisation, the perfume was removed from the capsules by rinsing with acetone, and the capsules lyophilised using standard procedures.

ATR-FTIR data confirmed presence of all components that were used in the reactions: 1100 1/cm [C—O—C (grafted PEGDE)], 1010 1/cm [C—O—C (dextrane)], 1000 1/cm [C—O—C (xyloglucane)].

EXAMPLE 2: POLYSACCHARIDE GRAFTING USING POLY(GLYCIDYL) METHACRYLATE (GMA)

Synthesis procedure in two steps.
1. Grafting of Poly(Glycidyl) Methacrylate 2 g of purified capsules containing a perfume was suspended in 13 ml DMF (dimethyl formamide) in a 100 ml flask under magnetic stirring. 7 g of GMA was added to this suspension, which was subsequently de-oxygenated by gentle nitrogen bubbling during 15 minutes. The flask was hermetically sealed and heated at 70° C. for four hours in order to perform the addition of the amino groups to the epoxide functionality of GMA.

60 mg of AIBN (azobisisobutyronitrile) in 1 ml degased DMF was added to initiate radical polymerisation, which was conducted for the next 90 minutes at 70° C. The suspension was cooled and filtered in order to retain the functionalised capsules. They were rinsed on the filter using copious amounts of water to remove residues of reagents and solvent. For the purpose of characterisation, the perfume was removed from the capsules by rinsing with acetone, and the capsules lyophilised using standard procedures.

2. Grafting of Dextrane onto GMA-Functionalised Microcapsules

The capsules synthesised in the first step were suspended in 13 ml DMSO (dimethylsulfoxide) containing 3 g of dextrane and 0.3 g of 4-(N,N-dimethylamino)pyridine (DMAP), in a 100 ml flask under magnetic stirring. The suspension was stirred at 70° C. for five hours. Upon cooling down, the mixture was filtered and the capsules rinsed with copious amounts of water. For the purpose of characterisation, the perfume was removed from the capsules by rinsing with acetone, and the capsules lyophilised using standard procedures.

Characterisation (GMA-Functionalisation).

Macroscopic observations: capsules became very hydrophobic and agglomerated strongly in an aqueous milieu; spherical morphology of the capsules preserved.

Gravimetry: the weight of the product was significantly larger than that of the starting capsules, even by 1000%, depending on the amount of GMA used.

TGA: characteristic behaviour of poly-GMA-degradation with its typical peaks observed ATR-FTIR: 3000 cm$^{-1}$ (—CH$_2$— of GMA), 1750 cm$^{-1}$ (C═O of GMA), 1150 cm$^{-1}$ (C—O of GMA)

RAMAN-IR: spectrum typical of poly-GMA; at 1250 1/cm band typical for the epoxy group observed Solid state NMR ($^{13}$C), δ (ppm): 44 ($C^{epoxy}$), 48 ($C^{epoxy}$), 70 ($CH_2^{GMA}$), 177 ($C$═$O^{GMA}$).

XPS: total coverage of the melamine shell by poly-GMA confirmed also by the full masking of the N-atoms on the surface (not observed), and by the increase of the C- and O-proportions and the detection of C—O bonds on the surface, as is typical for bulk poly-GMA.

(Dextrane Grafting onto GMA-Functionalised Capsules).

Macrospocpic observations: capsules hydrophilic, well dispersable in water.

ATR-FTIR: 1010 cm$^{-1}$ (C—O of dextrane)

RAMAN IR: disappearance of the epoxy band at 1250 1/cm

Solid state NMR ($^{13}$C), δ (ppm): 55-80 (broad peak of the carbon atoms of dextrane); disappearance of the epoxy signals at 44 and 48.

XPS: total coverage of the melamine shell by poly-GMA and dextrane confirmed also by the full masking of the N-atoms on the surface (not observed), and by the increase of the C- and O-proportions on the surface. In addition, the detection of supplementary C—O and C—C bonds on the surface indicates that dextrane was grafted.

Grafting of marked dextrane (by an alkyne or by a fluorescent marker fluoresceine isothiocyanate) confirmed by the detection of the marker groups (the alkyne by RAMAN IR and the fluorescent marker by fluorescence microscopy).

EXAMPLE 3: DEPOSITION OF THE CAPSULES FUNCTIONALISED BY DEXTRANE

Synthesis Procedure

In order to evaluate the number of capsules retained by a substrate (cotton was used), the capsules were functionalised by covalently grafting fluoresceine isothiocyanate (FITC) directly on to one sample of capsules and by grafting a fluoresceine isothiocyanate-modified dextrane on to another sample of capsules by means of the procedures described in Example 2.

The deposition was performed by contacting separate substrates, each a square piece of cotton (1×1 cm), with a magnetically-stirred suspension of 2 g of the two capsule samples in 30 ml water at 30° C. for 90 minutes. The substrate was subsequently rinsed with water at 30° C. in the same amount of water during 15 minutes. The deposition was evaluated using optical fluorescence microscopy and the result is shown in FIG. 1. FIG. 1a shows the results of the capsules without dextrane and FIG. 1b the capsules with dextrane. It is clear that the number of deposited capsules is much larger in the case of the dextrane-modified material than that with the unmodified capsules.

EXAMPLE 4: GRAFTING OF METHACRYLATE-FUNCTIONALISED POLYSACCHARIDE

Synthesis procedure in two steps.

1. Functionalisation of the Polysaccharide by Methacrylate

To a solution of 3 g of polysaccharide dextrane in 20 ml DMSO at 25° C. under magnetic stirring, 200 mg of solid DMAP was added and the solution stirred for 15 minutes. To this mixture, 2 g of GMA was added and the stirring continued at 70° C. during 8 hours. The product was precipitated from the mixture by slow addition of a cold 1:1 acetone/isopropanol solution (200 ml) under vigorous stirring. The solid was isolated by filtration. For purification, the solid was re-dissolved in 100 ml DMSO and precipitated with the cold mixture of acetone/isopropanol three times, at the end of which the final product was collected as solid and preserved under protection from light at 4° C.

2. Grafting on to Capsules 2 g of washed capsules containing a perfume was suspended in a solution of the material prepared above in DMF (100 ml) under magnetic stirring at 25° C. in a 200 ml flask. To this suspension, 7 g of GMA was added and the solution degassed by a gentle nitrogen bubbling during 15 minutes. The flask was sealed and the suspension stirred at 70° C. for four hours. Subsequently, 60 mg AIBN was added as solution in 1 ml DMF and the stirring at 70° C. continued another 90 minutes. The reaction mixture was cooled, the solid product isolated by filtration and purified by washing with copious amounts of DMSO. The capsules were lyophilised according to standard procedures for the characterisation.

Characterisation

G-1 (GMA-Functionalised Dextrane)

ATR-FTIR: 1720 1/cm ($COO^{ester}$ of acrylate)

NMR ($^1$H), δ (ppm): methacrylate peaks at 5-7 ($RCH=CH_2$)

NMR ($^{13}$C), δ (ppm): methacrylate peaks 18 ($CH_3$), 129 ($C(sp^2)$), 136 ($C^{quart}$), 167 ($C^{ester}$).

G (capsules)

ATR-FTIR: 1010 $cm^{-1}$ (C—O—C of dextrane), 1150 $cm^{-1}$ (C—O of GMA)), 1750 $cm^{-1}$ (C=O du GMA), 3000 $cm^{-1}$ (~$CH_2$- of GMA).

XPS: total coverage of the melamine shell by GMA and dextrane confirmed also by the full masking of the N-atoms on the surface (not observed), and by the increase of the C- and O-proportions on the surface. In addition, the detection of supplementary C—O, C=O, and C—C bonds on the surface indicates that both, GMA and dextrane, were grafted.

EXAMPLE 5: GRAFTING OF AN ENZYME (LIPASE) ON TO A CAPSULE SURFACE

Synthesis Procedure 2 g of capsules, modified by surface grafting of GMA (procedure from example 2, step 1), was suspended under magnetic stirring in 13 ml of a buffer solution (20 mM sodium phosphate, pH 7) containing 0.1 g of sodium dodecyl sulphate (SDS). To this suspension, 20 g of a lipase solution was added (Palatase® from Sigma-Aldrich at c>20 000 unit/gram) and the mixture was stirred at 37° C. for 24 hours. The modified capsules were isolated by filtration and rinsed with a copious amount of water. The final product was re-suspended in demineralised water and stored in the dark at 4° C.

The main function of the lipase is the hydrolysis of the lipids into fatty acids and glycerine. This reaction is widely used to evaluate the lipase activity after the immobilisation of the protein. In order to evaluate the activity of the lipase immobilised on the microcapsules, the capsules were suspended (at c=0.025 mass % of solid) in a gelatine-stabilised aqueous solution of olive oil (50% oil) and left without stirring at 35° C. for 24 hours. The results are shown in FIG. 2. FIG. 2a shows that the initial olive oil emulsion (left, clear and yellow) became a white, cloudy, two-phase system (right). NMR analyses of the liquids (FIG. 2b) showed that the white, cloudy liquid was an aqueous glycerine solution.

Acid-base titration of the white solid (fatty acids) confirmed its acid content in the solid 28 mmol/l, whereas only 2 mmol/l of acids was present in the starting olive oil.

A control experiment was prepared, where non-modified capsules (containing lipase that was not covalently bonded) were treated with the lipase solution described above. When contacted with the olive oil, these capsules did not show any hydrolytic activity whatsoever, showing that the lipase either does not remain adsorbed on the surface of the microcapsules, or that it is inactive if it did remain adsorbed.

In a similar experiment, an olive oil-stained cotton tissue was contacted with a suspension of the lipase-functionalised capsules (7 mass %) in demineralised water at 37° C. for 24 hours. No other agents (surfactants, bases or similar) were added to this suspension. The tissue was then rinsed. As can be seen from FIG. 3, the olive oil stain (left) had disappeared.

The invention claimed is:

1. A method of providing a modifier on the surface of an active-containing core-shell aminoplast microcapsule, comprising the covalent attachment of the modifier to the capsule shell surface by means of a coupling compound capable of covalent bonding to both shell and modifier by means of epoxy groups on the coupling compound, wherein the modifier comprises at least one polysaccharide, at least one enzyme, or combinations thereof; and wherein the coupling compound contains at least two epoxides or compounds that allow the formation of such compounds in situ.

2. The method according to claim 1, in which the shell is of melamine-formaldehyde resin.

3. The method according to claim 1, in which the enzyme is a lipase.

4. The method according to claim 1, in which the coupling compound is poly(ethylene glycol) diglycidyl ether having an Mn of from 300-10,000.

5. The method according to claim 1, in which the coupling compound is glycidyl methacrylate.

6. The method according to claim 5, in which the epoxy group of the glycidyl methacrylate is first reacted with the aminoplast of the shell, and free-radical addition polymerisation is then initiated with other glycidyl methacrylate molecules, to provide a plurality of epoxy groups.

7. The method according to claim 1, in which the coupling compound is first attached covalently to the shell, and subsequently is covalently attached to the modifier.

8. The method according to claim 1, in which the coupling compound is first attached covalently to the modifier, and subsequently is covalently attached to the shell.

9. The method according to claim 1 in which the modifier is selected from polysaccharide and enzyme and the coupling compound from poly(ethylene glycol) diglycidyl ether and glycidyl methacrylate.

10. A modified core-shell aminoplast microcapsule containing an active core and comprising on the shell surface a modifier, the modifier being covalently bonded to the shell by means of a coupling compound that is covalently bonded to both shell and modifier by means of epoxy groups on the coupling compound, wherein the modifier comprises at least one polysaccharide, at least one enzyme, or combinations thereof; and wherein the coupling compound contains at least two epoxides or compounds that allow the formation of such compounds in situ.

11. The microcapsule according to claim 10, in which the modifier is selected from polysaccharide and enzyme and the coupling compound from poly(ethylene glycol) diglycidyl ether and glycidyl methacrylate.

12. The microcapsule according to claim 10, in which the active core is fragrance.

13. A laundry product adapted to provide encapsulated fragrance on a washed article, comprising a laundry product base and fragrance-containing microcapsules according to claim 12.

14. The method according to claim 4, in which the coupling compound is poly(ethylene glycol) diglycidyl ether having an Mn of from 500-6,000.

15. The method according to claim 1, wherein the modifier is configured to interact with a substrate selected from the group consisting of skin, hair, fabrics, and combinations thereof.

16. The microcapsule according to claim 10, wherein the modifier is configured to interact with a substrate selected from the group consisting of skin, hair, fabrics, and combinations thereof.

17. The method according to claim 3, wherein the polysaccharide is selected from the group consisting of polymannanes, polyglucanes, polyglucomannanes, polyxyloglucanes, polygalactomannanes, xyloglucane, whole tamarind seed powder, and combinations thereof.

18. The method according to claim 1, wherein the modifier is in the form of a solution.

* * * * *